(12) United States Patent
Fujimoto

(10) Patent No.: US 8,779,321 B2
(45) Date of Patent: Jul. 15, 2014

(54) METHOD OF WELDING CIRCUIT CONDUCTOR AND TERMINAL OF CONTROL APPARATUS

(75) Inventor: Masao Fujimoto, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 516 days.

(21) Appl. No.: 12/880,779

(22) Filed: Sep. 13, 2010

(65) Prior Publication Data

US 2011/0062122 A1 Mar. 17, 2011

(30) Foreign Application Priority Data

Sep. 17, 2009 (JP) .................................. 2009-215144

(51) Int. Cl.
*B23K 35/38* (2006.01)
*B23K 9/167* (2006.01)

(52) U.S. Cl.
CPC ............ *B23K 9/167* (2013.01); *B23K 2201/38* (2013.01); *B23K 37/443* (2013.01)
USPC ........................................................ 219/75

(58) Field of Classification Search
USPC ............... 219/75, 50, 78.1, 83, 91.2, 118, 93; 439/887, 76.2, 76.1, 949, 969, 212, 439/884; 228/102, 4.1, 4.5
See application file for complete search history.

(56) References Cited

U.S. PATENT DOCUMENTS

| | | | | |
|---|---|---|---|---|
| 3,592,993 A | * | 7/1971 | Bennett ............................ | 219/83 |
| 5,847,937 A | * | 12/1998 | Cepa et al. .................... | 361/809 |
| 6,641,027 B2 | * | 11/2003 | O'Connell et al. ........ | 228/110.1 |
| 2008/0102716 A1 | | 5/2008 | Nishioka et al. | |

FOREIGN PATENT DOCUMENTS

JP 2008-110357 A 5/2008
JP 2009009962 A * 1/2009

* cited by examiner

*Primary Examiner* — Dana Ross
*Assistant Examiner* — Renee L Miller
(74) *Attorney, Agent, or Firm* — Crowell & Moring LLP

(57) ABSTRACT

A method of welding a circuit conductor and one of a plurality of terminals of an electronic component of a control apparatus by melting and joining by a welding arc from a first electrode of a micromini TIG welder, the method includes: using the electronic component including the terminals which are apart from each other; and arc-welding while only the one of the plurality of the terminals of the electronic component of the control apparatus which is to be welded and the circuit conductor to be welded are sandwiched by an earth clamp jig serving as a second electrode so that the one of the plurality of the terminals of the electronic component of the control apparatus which is to be welded and the circuit conductor to be welded are grounded.

3 Claims, 13 Drawing Sheets

METHOD OF WELDING CIRCUIT CONDUCTOR AND TERMINAL OF CONTROL APPARATUS

BACKGROUND OF THE INVENTION

This invention relates to a method of welding a circuit conductor and a terminal of a control apparatus having a plurality of terminals by melting and joining by a welding arc.

U.S. Patent Application Publication No. 2008-102716 (corresponding to Japanese Patent Application Publication No. 2008-110357) discloses a welding method of welding, by a resistance welding, a terminal of an FET (field effect transistor) and a bus bar which is a circuit conductor used in an EPS (electromotive power steering device) control unit. That is, in general, in the EPS control unit, the FET is soldered to a glass epoxy substrate (board), or the FET is soldered to a metal substrate (board). Moreover, in general, a projection is provided to the terminal of the FET, and the FET is joined to the bus bar and so on by the resistance welding. In an arc welding, the too large current flows at the welding, and too large current may break the electronic component. Accordingly, the arc welding is infrequently-used.

SUMMARY OF THE INVENTION

For mounting of the other components of the control unit for the EPS and so on which are for the high current, the micro spot TIG welder (micromini TIG welder) is frequently used. However, in case of the welding of the terminals of the FET and the bus bar, by flying the arc to the portion between the terminals, the element may be broken by the voltage greater than the withstand voltage or the current surge (overcurrent). Accordingly, by the conventional method, it is difficult to apply the micro spot TIG welding to the small control apparatus mounted on the vehicle.

It is, therefore, an object of the present invention to provide a method of welding a terminal of an electronic component and a circuit conductor, which is devised to solve the above mentioned problem, and to weld the terminal of the electronic component such as an FET and the circuit conductor such as a bus bar by a micromini TIG welder to prevent breakage of the electronic component, and to readily and surely weld by a low cost.

According to one aspect of the present invention, a method of welding a circuit conductor and one of a plurality of terminals of an electronic component of a control apparatus by melting and joining by a welding arc from a first electrode of a micromini TIG welder, the method comprises: using the electronic component including the terminals which are apart from each other; and arc-welding while only the one of the plurality of the terminals of the electronic component of the control apparatus which is to be welded and the circuit conductor to be welded are sandwiched by an earth clamp jig serving as a second electrode so that the one of the plurality of the terminals of the electronic component of the control apparatus which is to be welded and the circuit conductor to be welded are grounded.

According to another aspect of the invention, a method of welding a circuit conductor and one of a plurality of terminals of an electronic component of a control apparatus by melting and joining by a welding arc from a first electrode of a micromini TIG welder, the method comprises: setting at least two of the plurality of the terminals of the electronic component including the one of the plurality of the terminals to be welded, and another one of the plurality of the terminals which is influenced by a flying of the welding arc, to an identical potential by sandwiching the at least two of the plurality of the terminals of the electronic component, by an earth clamp jig serving as a second electrode; and arc-welding the one of the plurality of the terminals of the electronic component to be welded and the circuit conductor to be welded while the one of the plurality of the terminals of the electronic component to be welded and the circuit conductor to be welded are grounded.

According to still another aspect of the invention, a method of welding a circuit conductor and one of a plurality of terminals of an electronic component of a control apparatus by melting and joining by a welding arc from a first electrode of a micromini TIG welder, the method comprises: using the electronic component including the terminals which are apart from each other; setting at least two of the plurality of the terminals of the electronic component including the one of the plurality of the terminals to be welded, and another one of the plurality of the terminals which is influenced by a flying of the welding arc, to an identical potential by sandwiching the at least two of the plurality of terminals of the electronic component, by an earth clamp jig serving as a second electrode; and arc-welding the one of the plurality of the terminals of the electronic component to be welded and the circuit conductor to be welded while the one of the plurality of the terminals of the electronic component to be welded and the circuit conductor to be welded are grounded.

DETAILED DESCRIPTION OF THE INVENTION

The FET is for the high current. When the terminal of the FET is mounted to the glass epoxy board by the soldering, it is necessary that a special heat sink for the FET and a heat release system on the outside, or the exterior is used as a radiator plate (heat sink). Therefore, the number of the components, the control man-hour and so on are increased, so that the cost is increased. Moreover, a maximum allowable current of the glass epoxy board is low. The lifetime of the solder is concerned.

Moreover, when the terminal of the FET is mounted to the metal board by the soldering, the cost of the board is high. Furthermore, the number of the components, the control man-hour and so on are increased. Moreover, a special line for mounting on the metal board is needed. Consequently, the cost is increased. Moreover, the lifetime of the solder is concerned.

Moreover, when the terminal of the FET and the bus bar are mounted by the resistance welding, the resistance welding is a method of welding to generate the heat by the resistance of the welded member (object). The bus bar which is the circuit conductor is a low resistance metal (pure cooper, KFT or so on). The use of the resistance welding is difficult for the low resistance value of the metal. Moreover, when the terminal of the FET and the bus bar are made from the cooper, the welding becomes the spot welding. Therefore, the strength of the welding part is not stabilized at the resistance welding. Moreover, the load to the welder becomes large, and the measure for this is difficult.

Moreover, when a coat of different metal is used for increasing the resistance value, the electric resistance of the joining portion after the welding is increased. This causes the heat generation at the use of the FET. This needs a measure for the heat release.

Moreover, there is a laser welding as the welding method. The terminal of the FET and the bus bar are made from pure cooper. These terminals of the pure cooper such as the terminals of the FET and the bus bar poorly absorbs the laser light (beam), and reflects most of the energy. Accordingly, it is necessary to increase a rate of absorption by applying the coat. In this case, the control of the coating with high accuracy is needed. Consequently, this increases the cost.

Hereinafter, embodiments of the present invention are illustrated with reference to drawings.

Figure 1:
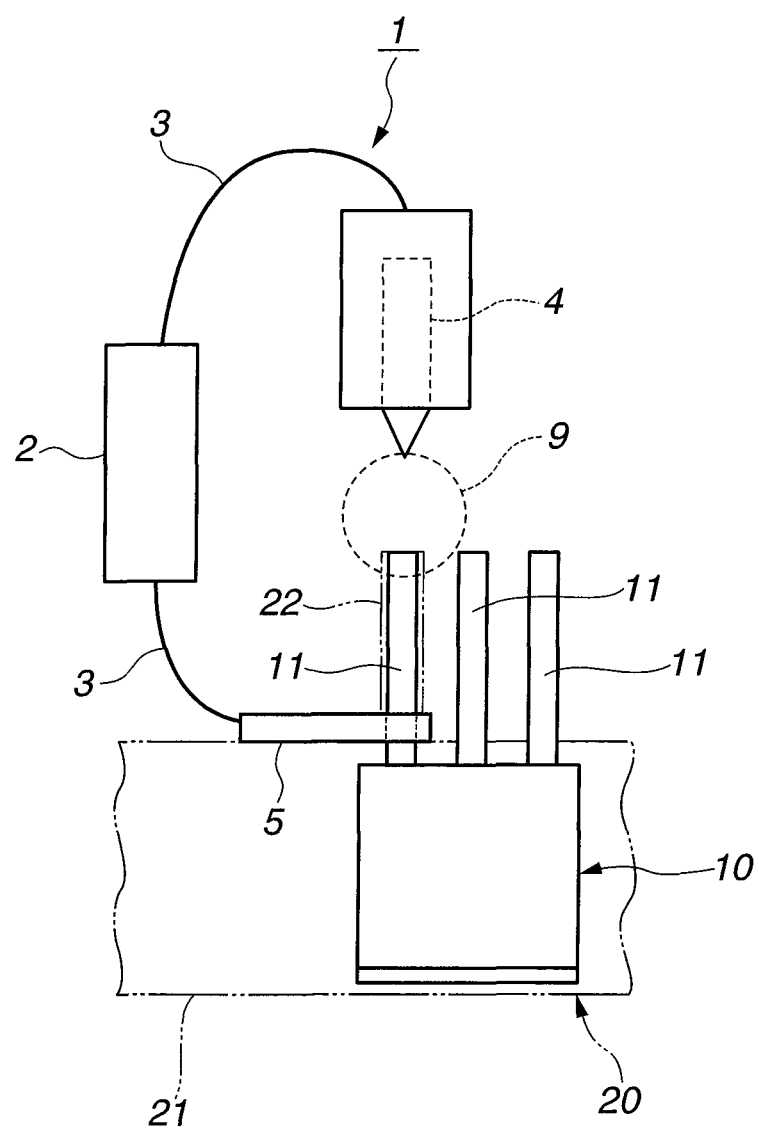
FIG. 1 is an illustrative view for illustrating a welding by a micro spot TIG welder according to a first embodiment of the present invention.

FIG. 1 is an illustrative view showing a welding by a micro spot TIG welder according to a first embodiment of the present invention.

As shown in FIG. 1, the micro spot TIG welder 1 is a micromini TIG welder. The micro spot TIG welder 1 melts (fuses) and joins, by a welding arc 9, a terminal 11 of an FET (field effect transistor) which is an electronic component, and a bus bar 22 which is a circuit conductor used in an electronic control unit 20 such as an EPS (electric power steering devise). This micro spot TIG welder 1 includes a welder body 2, an electrode (first electrode) 4 of a welding torch connected through a wire 3 to a negative terminal of the welder body 2, and an earth clamp jig 5 which is connected through the wire 3 to a positive terminal of the welder body 2, and which serves as an electrode (second electrode) to generate an arc discharge between the electrode 4 and the terminal 11 by clamping the terminal 11. This earth clamp jig 5 serving as the second electrode clamps and sandwiches the terminal 11 of the FET 10 and the bus bar 22 which are to be welded, to ground the terminal 11 of the FET 10 and the bus bar 22 which are to be welded at the welding.

A main part of the FET 10 is constituted by a source (not shown), a drain (not shown), a gate (not shown) and so on. In the main part of the FET 10, three terminals for the source, the drain, and the gate protrude, respectively, from a back surface of the main part of the FET 10, and extend in the upward direction in series. Terminals 11 are apart from each other by a distance by which a leakage of the welding arc 9 to the other terminals 11 which are not welded is not generated.

The electronic control unit 20 includes a unit body 21 made from a synthetic resin, and a plurality of bus bars (circuit conductors) 22 which form a circuit pattern on the unit body 21, and which are formed by molding to protrude in an upward direction.

Next, a welding between the terminal 11 of the FET 10 and the bus bar 22 of the electronic control unit 20 by welding method by using the micro spot TIG welder 1 is illustrated below.

As shown in FIG. 1, a large FET 10 is used to reduce the influence of the welding arc 9 generated from the first electrode 4 of the micro spot TIG welder 1. In the large FET 10, the terminals 11 are apart from each other so as not to generate the leakage of the welding arc 9 to the other terminals 11 which are not welded.

The FET 10 is inserted from the lower side of the unit body 21 of the electronic control unit 20. Then, one of the terminal 11 of the FET 10 which is to be welded is mounted so that the one of the terminals 11 is adjacent to the bus bar 22 which is to be welded, and which protrudes on the unit body 21.

Next, an end portion of the terminal 11 of the FET 10 to be welded and a welding part of an end portion of the bus bar 22 to be welded are melted and joined while only a base end portion of the terminal 11 of this FET 10 to be welded and a base end portion of the bus bar 22 to be welded are sandwiched by the earth clamp jig 5 to be grounded. At this arc welding, the welding condition that is suit for the terminal 11 and the bus bar 22 which are the welded object (work) is selected. For example, the welding condition is that a distance between the electrode 4 and the welding part of the welded object is shortened possibly, and the size of the welding arc 9 is decreased by decreasing the welding current. Moreover, at the start of the welding, the welding current is not suddenly increased by providing an upslope time so as to gently increase the welding current. With this, it is possible to suppress flying of the welding arc 9 to the peripheral terminals 11 and so on by suddenly flying the welding arc 9, and to suppress the joining strength and the electric capacity of the joining portion from becoming insufficient by generating a blowhole.

Next, after the TIG welding is finished, the earth clamp jig 5 is detached, the welding operation is finished. With this, the fusion joining and the diffusion joining of the members which has the single metal material is performed. With this, it is possible to perform the joining with the small electric resistance and the high strength.

In this way, the terminals 11 of the large FET 10 are apart from each other so as not to generate the leakage of the welding arc 9 to the other terminals 11 which are not welded. For example, when the terminal 11 for the gate is welded, only one of the terminals 11 to be welded and the bus bar 22 adjacent to the one of terminals 11 are sandwiched by the earth clamp jig 5 to be grounded. With this, the welding arc 9 does not fly to the terminals 11 for the drain and the source. The leakage of the welding arc 9 does not reach the inside of the FET 10. Accordingly, it is possible to prevent from generating the large voltage difference between the gate and the drain or the source, and from breaking an insulating film within the FET 10. Moreover, it is also possible to prevent from breaking the FET 10 by the voltage difference between the other terminals when the terminals 11 for the drain and the source are welded.

Moreover, in a case in which the other component of the electronic control unit 20 is mounted by the micro spot TIG welder 1, it is possible to perform the welding between the terminal 11 of the FET 10 and the bus bar 22 by the same micro spot TIG welder 1. With this, it is possible to decrease the solder, the equipment, the jig and tool, the operation and control man-hour, and so on, and thereby to decrease the cost. Moreover, it is possible to attain high volume production (mass production).

Figure 2:
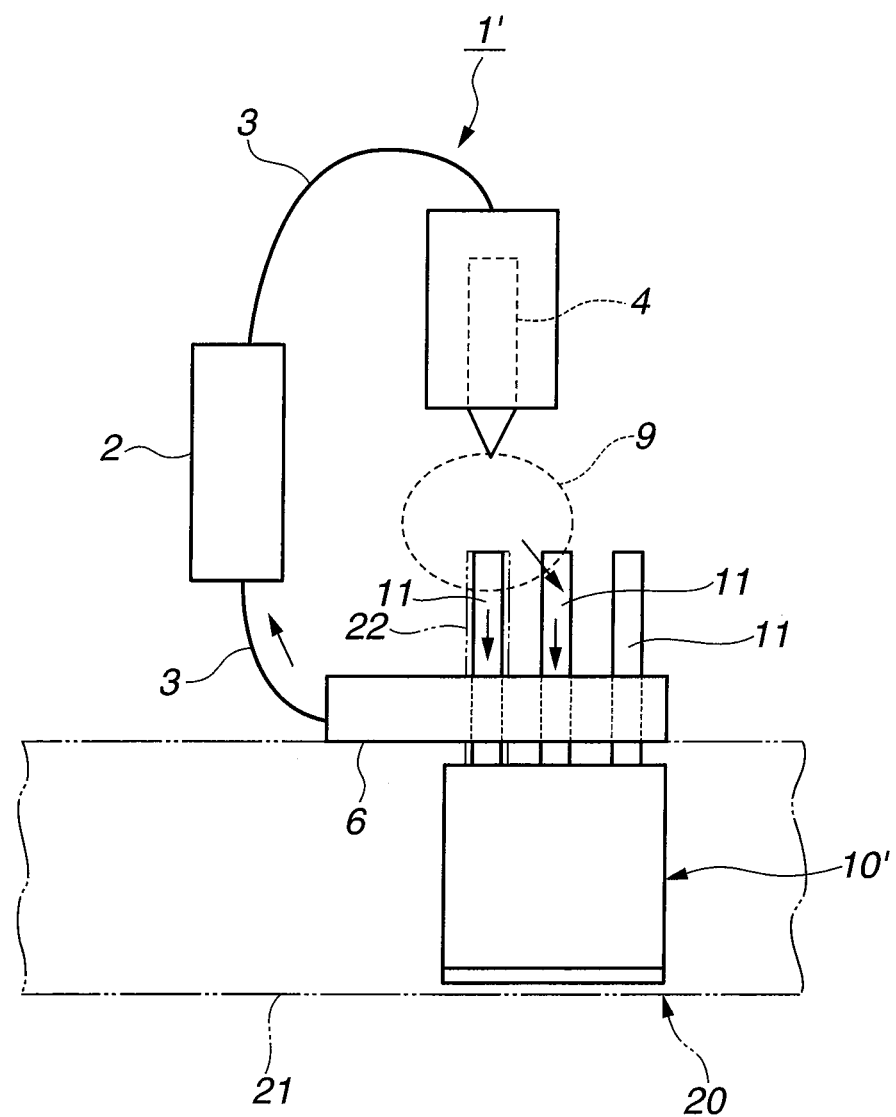
FIG. 2 is an illustrative view for illustrating a welding by a micro spot TIG welder according to a second embodiment of the present invention.
Figure 3:
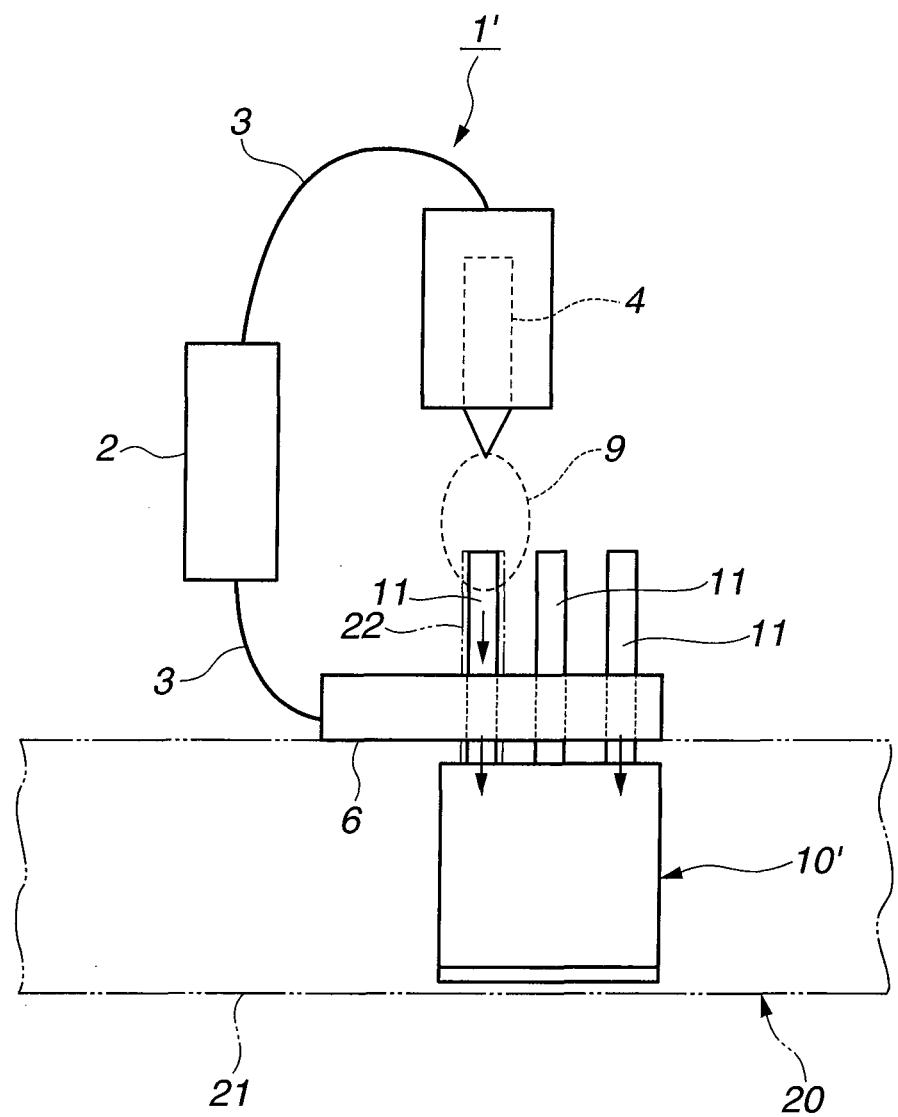
FIG. 3 is an illustrative view when the welding ark is small in the micro spot TIG welder according to the second embodiment of the present invention.

FIG. 2 is an illustrative view for illustrating a welding by a micro spot TIG welder according to a second embodiment of the present invention. FIG. 3 is an illustrative view when a welding arc is small in the micro spot welder.

This micro spot TIG welder 1' includes an earth clamp jig 6 which brings all of the three terminals of the FET (electronic component) 10' to an identical potential (identical electric potential) by clamping the all of the three terminals of the FET 10', and which also serves as the second electrode. The micro spot TIG welder 1' is substantially identical to the welder of FIG. 1 in most aspects as shown by the use of the same reference numerals.

Next, the welding between the terminal 11 of the FET 10' and the bus bar 22 of the electronic control unit 20 by the welding method by using the micro spot TIG welder 1' is illustrated below.

The micro spot TIG welder 1' uses the earth clamp jig 6 which sets all of the terminals 11 of the FET 10' to the identical potential, and a small FET 10' in which a distance between the terminals 11 and 11 is small.

As shown in FIG. 2, the FET 10' is inserted from the lower side of the unit body 21 of the electronic control unit 20. Then, the terminal 11 of the FET 10' to be welded is mounted to be adjacent to the bus bar 22 to be welded, and which protrudes on the unit body 21.

Next, the base end portions of all of the terminals 11 of this FET 10' and the base end portion of the bus bar 22 to be welded are sandwiched by the earth clamp jig 6 to be grounded, and then an end portion of the terminal 11 to be welded and a welding part of an end portion of the bus bar 22 are melted (fused) and joined. At this arc welding, the welding condition that is suit for the terminal 11 and the bus bar 22 which are the welded object (work) is selected. For example, the welding condition is that a distance between the electrode 4 and the welding part of the welded object is shortened, and the size of the welding arc 9 is decreased by decreasing the welding current. Moreover, at the start of the welding, the welding current is not suddenly increased by providing an upslope time so as to gently increase the welding current. With this, it is possible to suppress the flying of the welding arc 9 to the peripheral terminals 11 by suddenly flying the welding arc 9, and to suppress the joining strength and the electric capacity of the joining portion from becoming insufficient by generating a blowhole and so on.

Next, after the TIG welding is finished, the earth clamp jig 6 is detached, and the welding operation is finished.

As shown in FIG. 2, the arc welding is performed while the base end portions of all of the terminals 11 of the FET 10' are sandwiched by the earth clamp jig 6 to be grounded. With this, even when the welding arc 9 flies to the adjacent terminals 11 of the FET 10' which are not welded, the electricity does not enter within the FET 10', so that the FET 10' is not broken.

Moreover, even when the size of the welding arc 9 is decreased by decreasing the welding current of the micro spot TIG welder 1' as shown in FIG. 3, the base end portions of all of the terminals 11 of the FET 10' are sandwiched by the earth clamp jig 6 to be grounded, and the arc welding is performed. With this, all of the terminals 11 of the FET 10' become the identical potential by the earth clamp jig 6. Accordingly, it is possible to decrease the load between the terminals 11 of the FET 10'. Therefore, there is no voltage difference between the terminals 11, and it is possible to prevent from breaking the FET 10'.

However, the second embodiment shown in FIGS. 2 and 3 is applied to the small FET 10' in which the terminals 11 are apart from each other by a relatively short distance, unlike the first embodiment. The welding arc 9 of the micro spot TIG welder 1' may fly to the terminals 11 of the FET 10' which are not welded. The welding degree varies at each terminal, and the welding may not stabilize. Accordingly, as shown in FIGS. 4 and 5, it is preferable to use the small FET (electronic component) 10A and 10B in which the terminals 11 are apart from each other by a predetermined distance.

Figure 4:
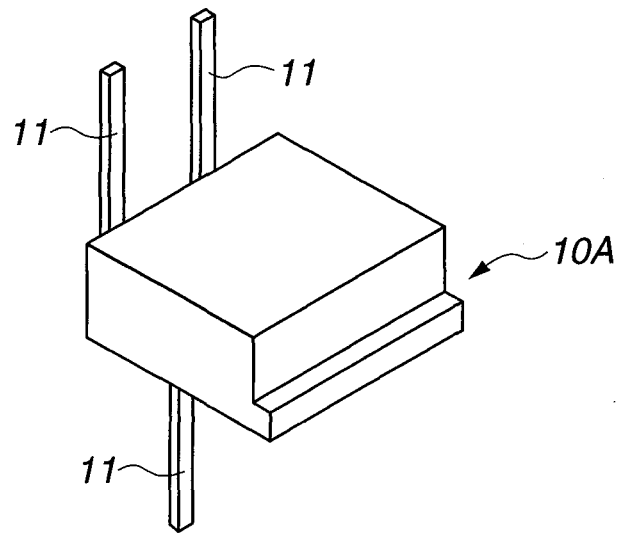
FIG. 4 is a perspective view showing an electronic component which is preferable for the micro spot TIG welder according to the second embodiment.
Figure 5:
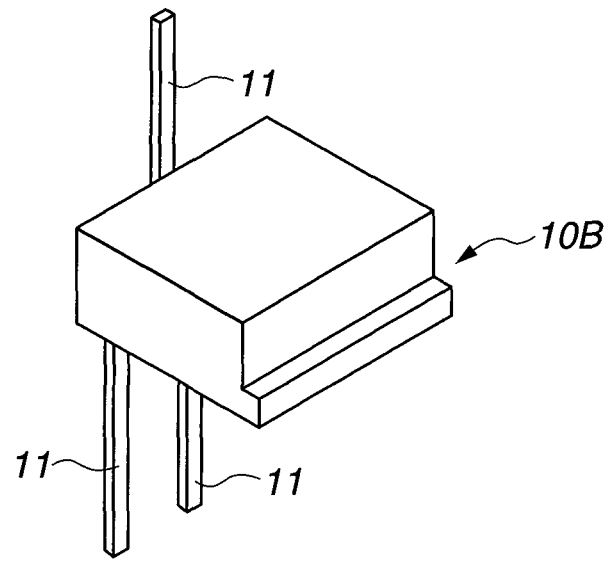
FIG. 5 is a perspective view showing another electronic component which is preferable for the micro spot TIG welder according to the second embodiment.

The FET 10A shown in FIG. 4 includes both side terminals 11 which are bent in the upward direction to be perpendicular to an upper surface of the FET 10A, and a central terminal 11 which is bent in the downward direction to be perpendicular to a lower surface of the FET 10A. With this, a clearance between welding parts of the terminals 11 and 11 is widened. The FET 10B shown in FIG. 5 includes both side terminals 11 which are bent in the downward direction to be perpendicular to a lower surface of the FET 10B, and a central terminal 11 which is bent in the upward direction to be perpendicular to an upper surface of the FET 10B. With this, a clearance between welding parts of the terminals 11 is widened.

By using the small FET 10A and 10B in which the clearance between the terminals 11 is widened, it is possible to suppress the welding arc 9 from flying to the other terminals 11 which are not welded. Accordingly, it is possible to suppress the influence of the flying of the welding arc 9 to the other terminals 11 which are not welded, and to surely prevent the breakage of the insides of the FET 10A and 10B by decreasing the leakage of the welding arc 9. In a case in which the clearance between the terminals 11 is widened so as not to generate the leakage of the welding arc 9 to the other terminals 11 which are not welded, the only terminal 11 to be welded may be earth-clamped, like using the large FET 10.

In this way, each of the terminals 11 of the FET 10', 10A and 10B and the bus bar 22 are joined by the micro spot TIG welder 1'. With this, it is possible to increase and stabilize the strength of the welding parts of the terminal 11 and the bus bar 22 for the fusion joining and diffusion jointing. Moreover, it is possible to decrease the number of the components. Furthermore, the micro spot TIG welder 1' may be used for mounting other components of the electronic control unit 20. When the micro spot TIG welder 1' is shared for the joint of the terminal 11 and the bus bar 22, and the joint of the other welding parts, new equipment only for the welding of the terminals 11 of each of the FET 10', 10A and 10B and the bus bar 22 is not needed. Moreover, it is possible to decrease the solder, the equipment, the jig and tool, the operation and control man-hour, and thereby to decrease the cost. Furthermore, it is possible to attain the mass-production.

Figure 6A:
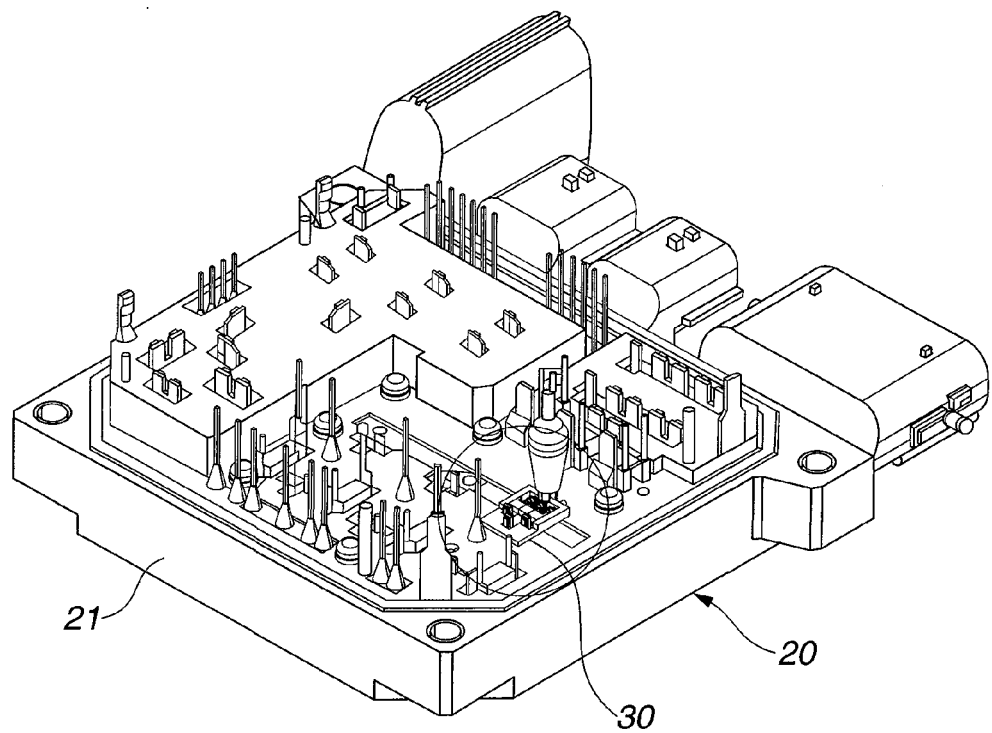
FIG. 6A is a perspective view showing a control unit used in a micro spot TIG welder according to a third embodiment of the present invention.
Figure 6B:
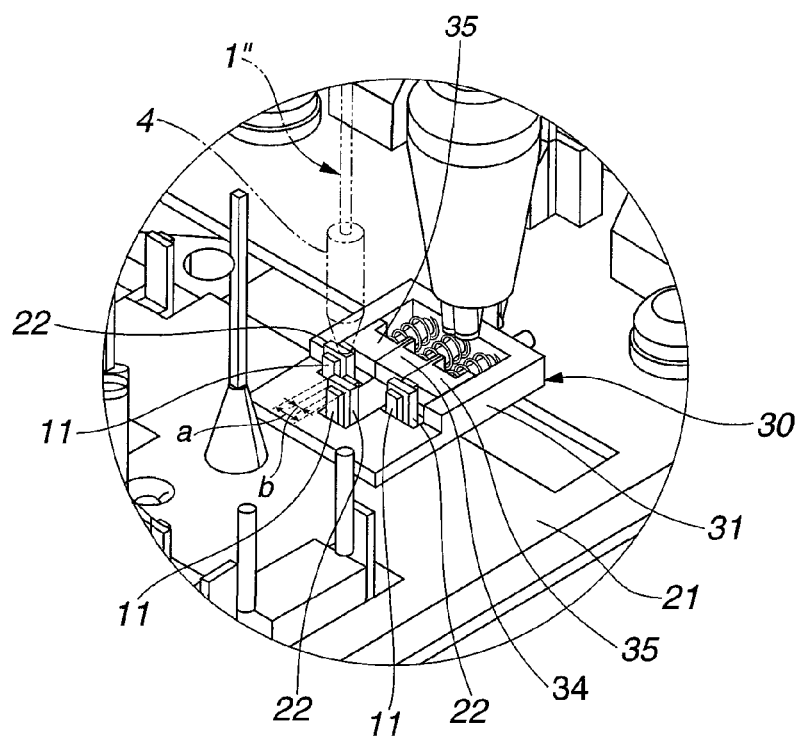
FIG. 6B is an enlarged perspective view showing a welding part of the control unit.
Figure 7A:
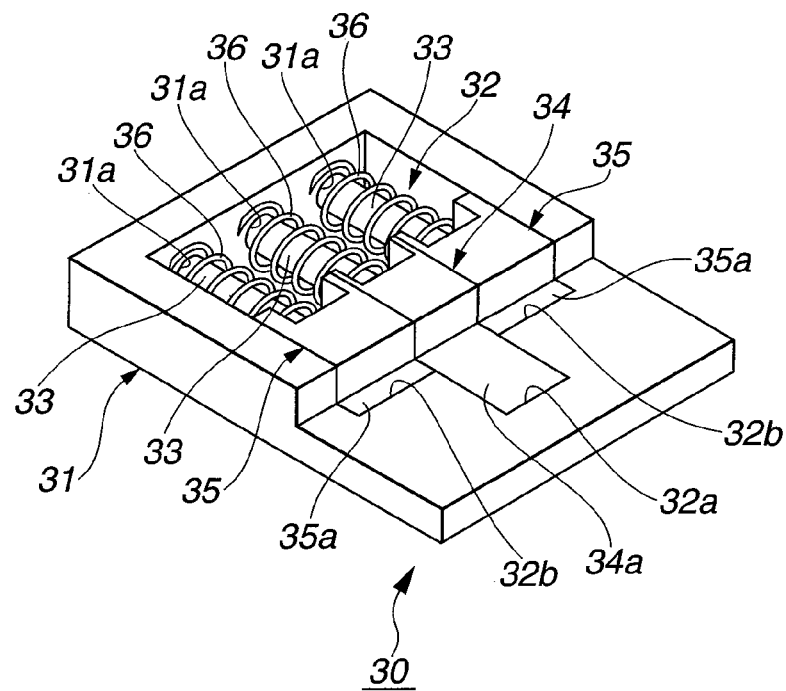
FIG. 7A is a perspective view showing an earth clamp jig used in the micro spot TIG welder according to the third embodiment.
Figure 7B:
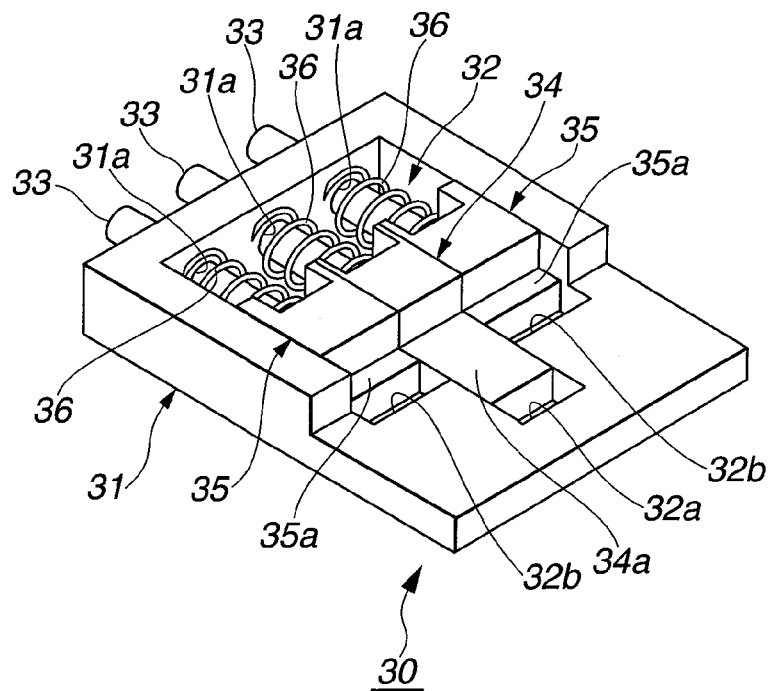
FIG. 7B is a perspective view showing a state in which clampers of the earth clamp jig are opened.
Figure 8:
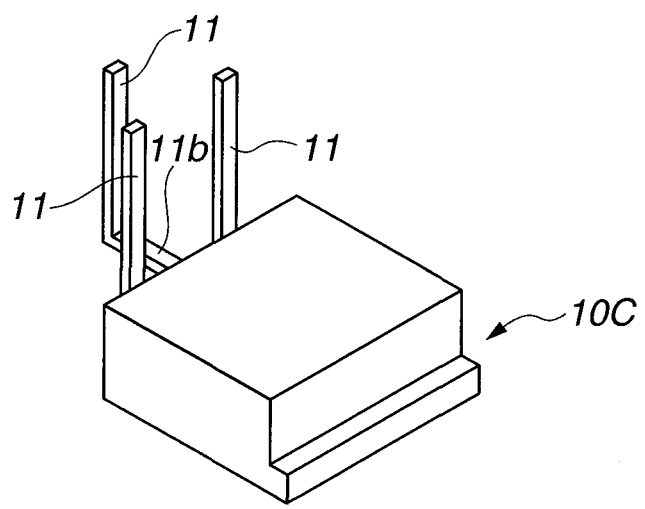
FIG. 8 is a perspective view showing an electronic component used in the micro spot TIG welder according to the third embodiment.

FIG. 6A is a perspective view showing an electronic control unit used in a micro spot TIG welder according to a third embodiment of the present invention. FIG. 6B is an enlarged perspective view showing a welding part of the electronic control unit. FIG. 7A is a perspective view showing an earth clamp jig used in the micro spot TIG welder. FIG. 7B is a perspective view showing a state in which clampers of the earth clamp jig are opened. FIG. 8 is a perspective view showing an electronic component used in the micro spot TIG welder.

As shown in FIGS. 6A and 6B, the micro spot TIG welder 1" includes an earth clamp jig 30 which serves as the second electrode that sets three terminals 11 of an FET (electric component) 10C to the identical potential by clamping all of the three terminals 11 of the FET 10C. As shown in FIGS. 6A and 8, this earth clamp jig 30 is used for a small FET such as an FET 10C including terminals 11 which are apart from each other. In particular, both side terminals 11 of the FET 10C are bent in the upward direction. A central terminal 11 of the FET 10C extends in a direction apart from the FET 10C (in a direction substantially perpendicular to a direction in which the both side terminals 11 extend), and largely bends in the upward direction. With this, clearances between the terminals 11 and 11 are widened. The terminals 11 have a clearance so as not to generate the leakage of the welding arc 9 to the terminals 11 which are not welded. The earth clamp jig 30 is used for the thus-constructed FET 10C.

As shown in FIGS. 6A and 6B and FIGS. 7A and 7B, the earth clamp jig 30 includes a frame-shaped jig body 31, cylindrical piston rods 33, 33 and 33, a long clamper 34, and short clampers 35 and 35. The jig body 31 is made of the metal. The jig body 31 includes a receiving space 32 which is formed within the jig body 31, and which is a raised stepped shape corresponding to the arrangement of the terminals 11. Each of the cylindrical rods 33, 33 and 33 is made of the metal. The cylindrical rods 33, 33 and 33 are slidably supported, respectively, by circular holes 31a, 31a and 31a formed on the base end portion of the jig body 31. The long clamper 34 is made of the metal. The long damper 34 is fixed on an end of the central piston rod 33. The long clamper 34 reciprocates (moves in the back and forth direction) through a compression coil spring 36 in a central receiving portion 32a of the receiving space 32. Each of the short clampers 35 and 35 is made of the metal. The short clampers 35 and 35 are fixed, respectively, on ends of the piston rods 33 and 33. The short dampers 35 and 35 reciprocate (move in the back and forth direction), respectively, through compression coil springs 36 in both side receiving portions 32b and 32b of the receiving space 32.

The central terminal 11 of the FET 10 is sandwiched with no clearance between an inside wall of the central receiving portion 32a of the earth clamp jig 30 and the end portion 34a of the long clamper 34. The both side terminals 11 and 11 are sandwiched, respectively, with no clearances between inside walls of the both side receiving portions 32b and 32b of the earth clamp jig 30 and end portions 35a of the both side short clampers 35 and 35. In this case, the terminals 11 of the FET 10C are sandwiched and clamped, respectively, between the end portions 34a and 35a of the clampers 34 and 35 and the inside walls of the receiving portions 32a and 32b in a state in which the clampers 34 and 35 are positioned in the backward direction against the urging forces of the compression coil springs 36. The earth clamp jig 30 is set for the FET. Therefore, when the earth clamp jig 30 is used for the other components, the shape is varied in accordance with the numbers of the terminals and the arrangement of the terminals of the other component.

Figure 9:
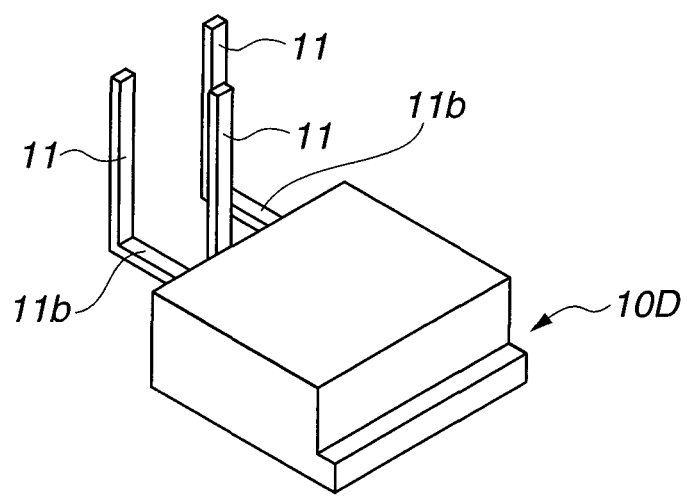
FIG. 9 is a perspective view showing another electronic component used in the micro spot TIG welder according to the third embodiment.

Moreover, an FET (electronic component) 10D shown in FIG. 9 may be used as the small FET in which the terminals 11 are apart from each other. In this FET 10D, each of both side terminals 11 includes an arm portion 11b extending in a direction apart from the FET 10D relative to the central terminal 11 (in a direction substantially perpendicular to a direction in which the central terminal 11 extends), and largely bends in an L-shape in the upward direction. Moreover, the central terminal 11 is bent in the upward direction from a back surface of the FET 10D to be perpendicular to an upper surface of the FET 10D. With this, a clearance between welding parts of the terminals 11 and 11 are widened. The earth clamp jig 30 is used in a direction (of the forward and rearward directions) opposite to the direction when the earth clamp jig 30 sandwiches the terminals 11 of the FET 10C.

Next, the welding between the terminal 11 of the FET 10C and the bus bar 22 of the electronic control unit 20 by the welding method by using the micro spot TIG welder 1" is illustrated below.

This micro spot TIG welder 1" uses the earth clamp jig 30 which brings all of the terminals 11 of the FET 10C to the identical potential by clamping all of the terminals 11 of the FET 10C. Accordingly, it is possible to use the small FET 10C including terminals 11 which are apart from each other by a relatively small distance.

As shown in FIGS. 6A and 6B, the FET 10C is inserted from the lower side of the unit body 21 of the electronic control unit 20. One of the terminals 11 of the FET 10C to be welded is mounted to be adjacent to one of the bus bars 22 which protrudes on the unit body 21, and which is to be welded.

As shown in FIG. 6B, each of the bus bars 22, 22 and 22 has a width a which is longer than a width b of the corresponding one of the terminals 11. Moreover, a width surface of each of the terminals 11 and a width surface of one of the bus bars 22 are clamped so that the width surface of the each of the terminals 11 and the width surface of the one of the bus bars 22 contact each other. Moreover, each of the bus bars 22, 22 and 22 is disposed on a surface of one of the terminals 11, 11 and 11 which confront the body (a center) of the FET 10C (on the inside with respect to the terminal 11). The relative shape and arrangement between the bus bars 22 and the terminals 11 attains effects described below.

1) The long and short clampers 34 and 35 urged by the compression coil springs 36 of the earth clamp jig 30 press the bus bars 22 with the large width. Moreover, the bus bars 22 press, respectively, the terminals 11 with the small width which are adjacent to the bus bars 22, against the inside walls of the receiving portions 32a and 32b. Accordingly, the long and short clampers 34 and 35 do not directly press the terminals 11 with the small width. The long and short clampers 34 and 35 press the terminals 11 through the bus bars 22 with the large width. Even when the backlash, or the misalignment of the pressing direction and the pressing force of the long and short clampers 34 and 35 is generated, these are received in the receiving portions 32a and 32b of the earth clamp jig 30 which are integrally formed, and which has a relatively large strength. With this, the terminals 11 are not misaligned or bent at the clamp. Accordingly, it is possible to clamp so that each of the terminals 11 is positioned at a substantially central position of the lateral width a of one of the bus bars 22.

2) Each of the bus bars 22 has the lateral width a which is longer than the lateral width b of one of the terminals 11. Accordingly, it is possible to decrease the electric resistance value of each of the bus bars 22, and to suppress the heat generation of the joining portion between each of the bus bars 22 and one of the terminals 11.

As another embodiment, the central bus bar 22 may be disposed on a surface of the corresponding terminal 11 which confronts the body (the center) of the FET 10C (on the inside with respect to the corresponding terminal 11). The both side bus bars 22 may be disposed, respectively, on surfaces of the corresponding terminals 11 (on the outside with respect to the corresponding terminals 11) which are opposite to the surfaces of the corresponding terminals 11 which confront the body of the FET 10C. In this case, the both side bus bars 22 and 22 may be wired from the FET 10C's side. The central bus bar 22 may be wired from a direction opposite to the FET 10C's side. Accordingly, by using this structure when the wire needs to avoid the central bus bar 22, it is possible to simplify the wiring of the central bus bar 22, and to relatively shorten the length of the wire.

Next, the base end portions of all of the terminals 11 of this FET 10C and the base end portions of the bus bars 22 to be welded are sandwiched between the inside walls of the receiving portions 32a and 32b of the jig body 31 of the earth clamp jig 30 and the end portions 34a and 35a of the clamper 34 and 35 to be grounded, and the end portions of the terminals 11 to be welded and the welding portions of the end portions of the bus bars 22 are melted and joined. At this arc welding, the welding condition that is suit for the terminal 11 and the bus bar 22 which are the welded object (work) is selected. For example, the welding condition is that a distance between the electrode 4 and the welding part of the welded object is shortened, and the size of the welding arc 9 is decreased by decreasing the welding current. Moreover, at the start of the welding, the welding current is not suddenly increased by providing an upslope time so as to gently increase the welding current. With this, it is possible to suppress the flying of the welding arc 9 to the peripheral terminals 11 by suddenly flying the welding arc 9, and to suppress the joining strength and the electric capacity of the joining portion from becoming insufficient by generating the blowhole and so on.

Next, after the TIG welding is finished, the earth clamp jig 30 is detached, and the welding operation is finished.

As shown in FIGS. 6A and 6B, the arc welding is performed while the base end portions of all of the terminals 11 of the FET 10C are sandwiched by the earth clamp jig 30 to be grounded. With this, even when the welding arc 9 flies to the adjacent terminal 11 which is not welded, the electricity does not enter the inside of the FET 10C. Accordingly, the FET 10C is not broken. Moreover, even when the size of the welding arc 9 is decreased by decreasing the welding current of the micro spot TIG 1", all of the terminals 11 of the FET 10C are brought to the identical potential by the earth clamp jig 30 when the arc welding is performed while the base end portions of all terminals 11 of the FET 10C are sandwiched by the earth clamp jig 30. With this, it is possible to decrease the load between the terminals 11 of the FET 10. There is no potential difference between the terminals 11 and 11. Accordingly, the FET 10 is not broken.

In this way, by using the small FET 10C including the terminals 11 which are apart from each other to have a large clearance, it is possible to suppress the welding arc 9 from flying to the terminals 11 which are not welded. Accordingly, it is possible to suppress the influence of the flying of the welding arc 9 to the other terminals 11 which are not welded. Moreover, it is possible to surely prevent the breakage and so on of the inside of the FET 10C by decreasing the leakage of the welding arc 9.

Moreover, the base end portions of all of the terminals 11 of the FET 10 and the base end portions of the bus bars 22 to be welded can be sandwiched, respectively, without clearances between the inside walls of the receiving portions 32a and 32b of the jig body 31 of the earth clamp jig 30 and the end portions 34a, 35a of the clampers 34 and 35. With this, it is possible to improve the accuracy of the joining of the TIG welding, to improve the mass-production, and to decrease the cost.

Figure 10:
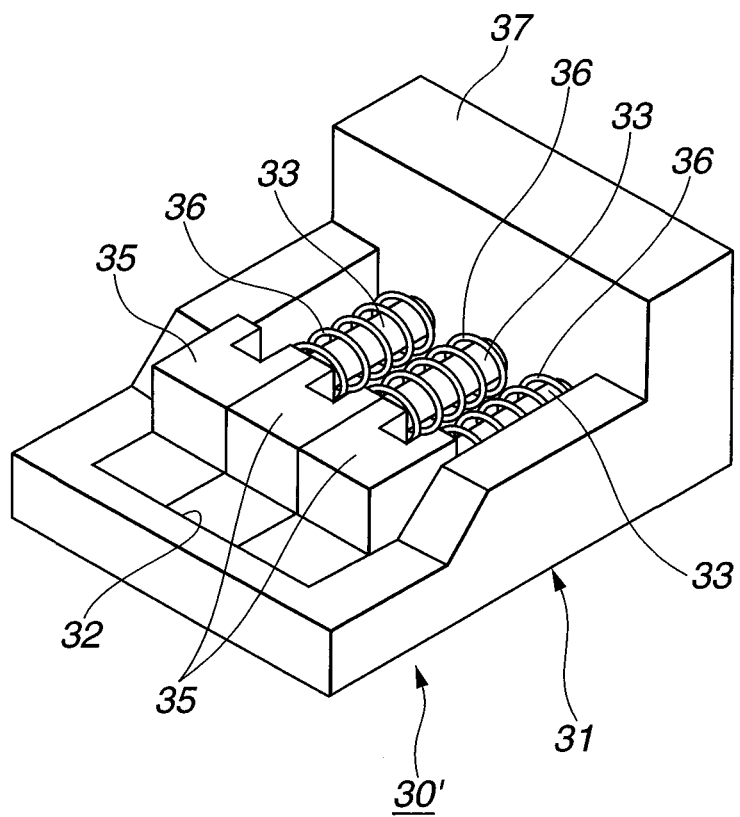
FIG. 10 is a perspective view showing a variation of an earth clamp jig used in the micro spot TIG welder according to the third embodiment.

Moreover, an earth clamp jig 30' including an earth clamp protrusion 37 as shown in FIG. 10 may be used as the earth clamp jig. This earth clamp jig 30' includes the earth clamp protrusion 37, and accordingly it is possible to easily connect to the earth wire (lead). The wiring for the each connection of the earth wire may be provided to the clamp. The earth clamp jig 30' shown in FIG. 10 is not the earth clamp jig used for the small FET 10 shown in FIG. 8 which includes the terminals 11 with the large clearances. However, it is possible to handle the welding of the terminals 11 of the small FET 10C and so on by varying the positions of three clampers 35, 35 and 35 like the earth clamp 30 shown in FIGS. 7A and 7B.

Figure 11:
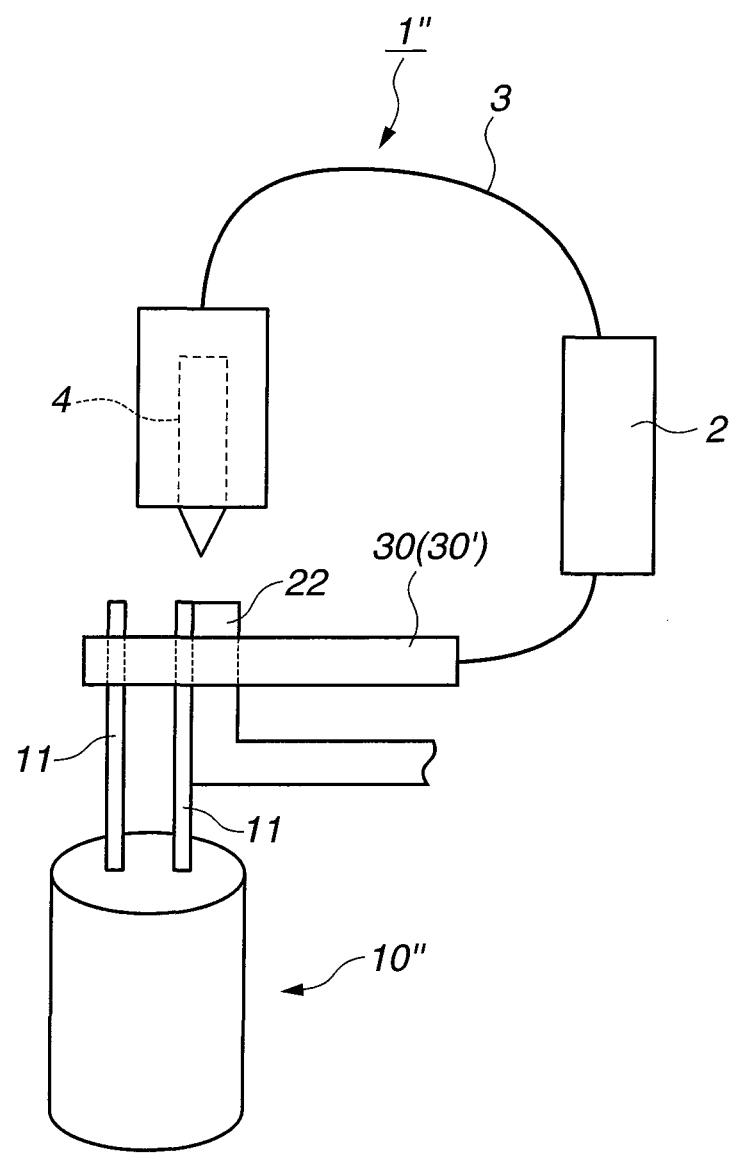
FIG. 11 is an illustrative view showing a welding of another element by the micro spot TIG welder according to the third embodiment.

Moreover, in the third embodiment, the FET is used as the electronic component. However, the third embodiment is applicable to a capacitor (another element) 10" or I/C and so on, as shown in FIG. 11. In this embodiment, all of the terminals are clamped. However, it is optional to clamp only terminal which may cause a problem in a withstand voltage and so on.

Moreover, the micro spot TIG welder 1" may be used for mounting of the other components of the electronic control unit 20. In a case in which the micro spot TIG welder 1" is shared for the welding of the terminals 11 of the FET 10C and the bus bar 22, and the welding of the other welding parts, new equipment only for the welding of the terminals 11 of the FET 10C and the bus bar 22 becomes unnecessary. Moreover, it is possible to decrease the solder, the equipment, the jig and tool, the operation and control man-hour, thereby to decrease the cost, and to attain the mass-production.

Figure 12:
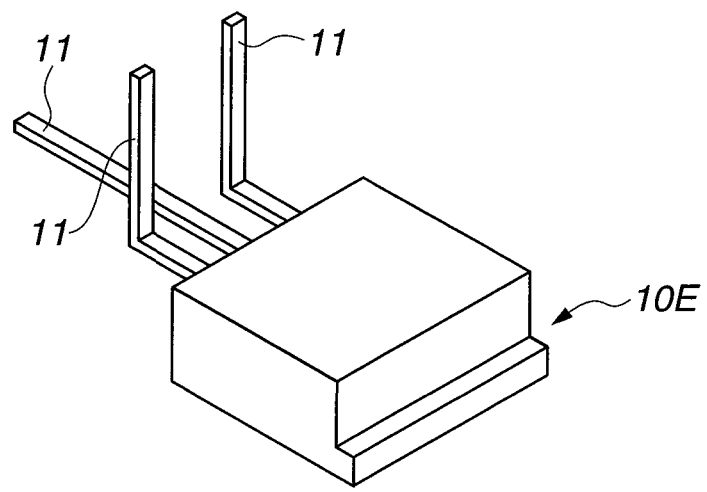
FIG. 12 is a perspective view showing another electronic component used in the micro spot TIG welder according to the third embodiment.
Figure 13:
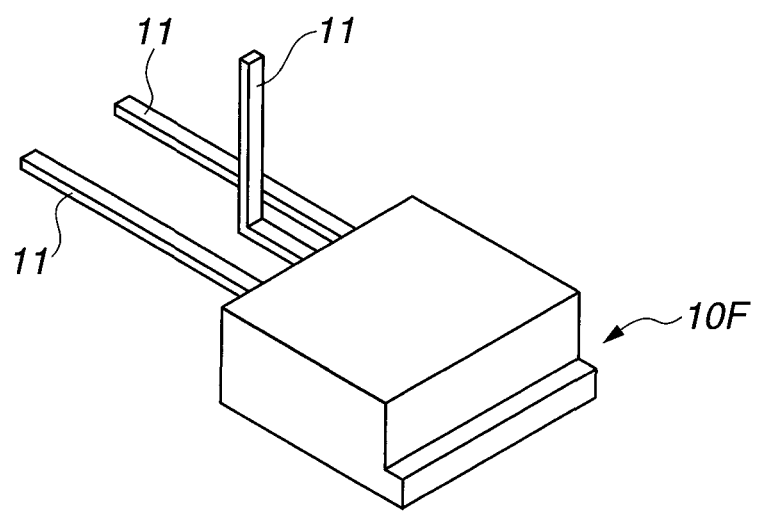
FIG. 13 is a perspective view showing still another electronic component used in the micro spot TIG welder according to the third embodiment.

Moreover, when the terminal 11 and the bus bar 22 are welded by the micro spot TIG welder 1", it is possible to use small FETs (electronic component) 10E and 10F each including terminals 11 which are apart from each other, as shown in FIGS. 12 and 13.

The FET 10E shown in FIG. 12 includes both side terminals 11 which are bent in the upward direction or in the downward direction so as to be perpendicular to an upper surface or a lower surface of the FET 10E, and a central terminal 11 which is not bent, and which extends straight from the back surface of the FET 10E. With this, a clearance between the welding parts of the terminals 11 and 11 becomes wide. The FET 10F shown in FIG. 13 includes both side terminals 11 which are not bent in the upward direction to be perpendicular to the upper surface of the FET 10F, and which extend straight from the back surface of the FET 10F, and a central terminal 11 which is bent in the upward direction or in the downward direction so as to be perpendicular to an upper surface or a lower surface of the FET 10F. With this, a clearance between the welding parts of the terminals 11 and 11 becomes wide. Accordingly, it is possible to widen the clearance between the central terminal 11 and the both side terminals 11 and 11, and to suppress the welding arc 9 from flying to the adjacent terminals 11 at the welding.

Figure 14:
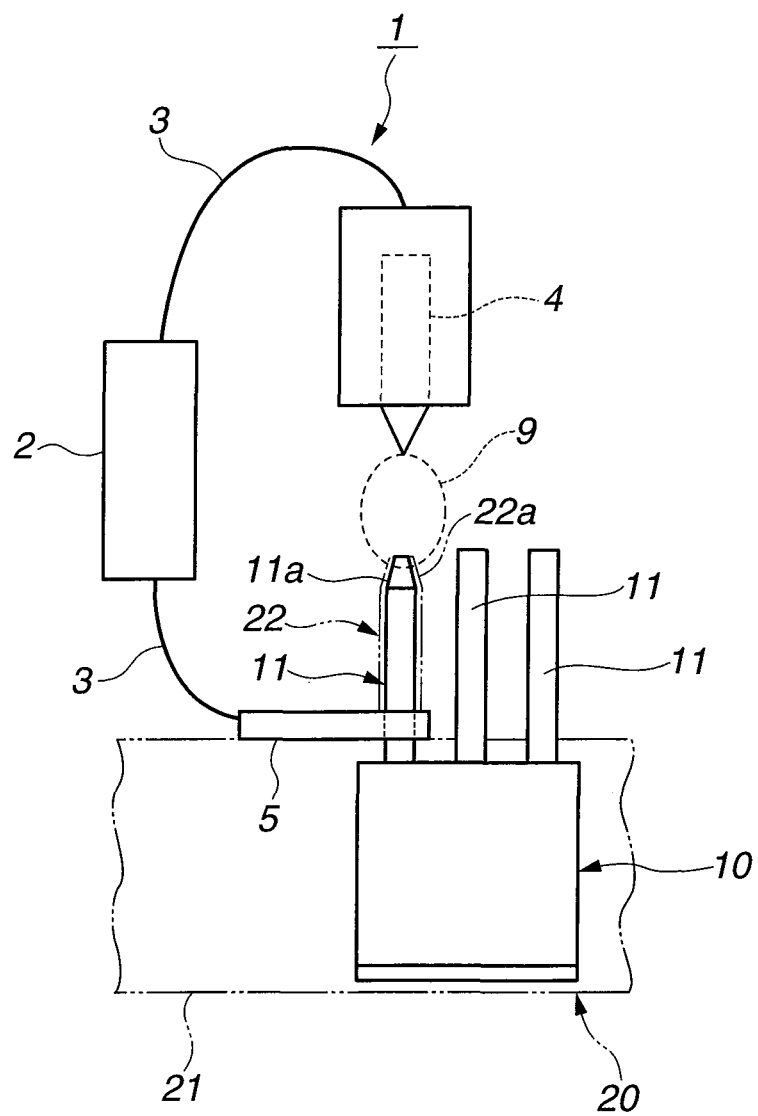
FIG. 14 is an illustrative view showing a welding by a micro spot welder TIG according to a fourth embodiment of the present invention.

FIG. 14 is an illustrative view for illustrating a welding by a micro spot TIG welder according to a fourth embodiment of the present invention.

In the fourth embodiment, for decreasing the size of the welding arc 9 of the micro spot TIG welder 1, the end portion 11a of the terminal 11 of the large FET 10 which is the welding part has a tapered shape, and the end portion 22a of the bus bar 22 has a tapered shape.

In this way, by using the tapered end portion 11a of the terminal 11 of the large FET 10 and the tapered end portion 22a of the bus bar 22 which are the welding parts, it is possible to suppress the welding arc 9 from diffusing (flying). Moreover, each of the end portions 11a and 22a has the narrow width. With this, it is possible to accurately introduce the welding arc 9, and thereby to sufficiently weld even by the small arc ball. Accordingly, it is possible to suppress the power of the micro spot TIG welder 1, and thereby to further decrease the influence of the heat on the other parts. Consequently, it is possible to sufficiently weld even by the small welding arc 9. Therefore, it is possible to decrease the size of the welding arc 9 by decreasing the power of the welding of the micro spot TIG welder 1 relative to the micro spot TIG welder shown in FIG. 1. Consequently, it is possible to suppress the welding arc 9 from flying to the other terminals 11 which are not welded, and thereby to suppress the influence of the flying of the welding arc 9 on the other terminals 11 which are not welded. Moreover, it is possible to prevent the breakage and so on of the inside of the large FET 10 by decreasing the leakage of the welding arc 9.

In particular, the arc welding which uses the tapered end portions 11a and 22a of the terminal 11 and the bus bar 22 that are welding parts is effective to the small FET 10' and 10A-10F in which the terminals 11 are apart from each other by a small distance. That is, when the terminals 11 of the small FET 10' and 10A-10F and the bus bar 22 are welded, it is possible to attain the effects identical to the effects of the second and third embodiments. Moreover, by using the tapered end portions 11a and 22a of the terminal 11 of the small FET 10' and 10A-10F and the bus bar 22, it is possible to suppress the diffusion (flying) of the welding arc 9, and to sufficiently weld by the small welding arc 9. Accordingly, it is possible to decrease the size of the welding arc 9 by decreasing the power of the welding of the micro spot TIG welder 1 relative to the welding of the micro spot TIG welder of FIG. 1. Therefore, it is possible to suppress the welding arc 9 from flying to the other terminals 11 which are not welded, to suppress the influence of the welding arc on the other terminals 11 which are not welded, and to surely prevent the breakage and so on of the insides of the small FET 10' and 10A-10F by decreasing the flying of the welding arc 9 to the other terminals 11.

Figure 15A:
FIGS. 15A-15D are illustrative views showing shapes of terminals used in the welding of the fourth embodiment.
Figure 15B:
Figure 15C:
Figure 15D:

The shapes of the end portions 11a and 22a of the terminal 11 and the bus bar 22 are not limited to the tapered shapes shown in FIG. 14. As shown in FIG. 15A, the entire of the terminal 11 or the bus bar 22 may be tapered toward a tip (upper) end portion of the terminal 11 or the bus bar 22. As shown in FIG. 15B, the end portion may have a raised shape. As shown in FIG. 15C, the end portion may have a semicircular (semiround) shape. As shown in FIG. 15D, the entire may be thin (have a narrow width). In this way, the ends of the end portions 11a and 22a of the terminal 11 and the bus bar 22 which confront the electrode 4 of the micro spot TIG welder 1 are cut to have narrow widths, and then the terminal 11 and the bus bar 22 are welded by the welding arc 9. With this, it is possible to accurately introduce the welding arc 9 since the end portions 11a and 22a have the narrow widths. Accordingly, it is possible to sufficiently weld even by the small arc ball, to suppress the power of the micro spot TIG welder 1, and to further decrease the heat influence on the other parts.

Figure 16:
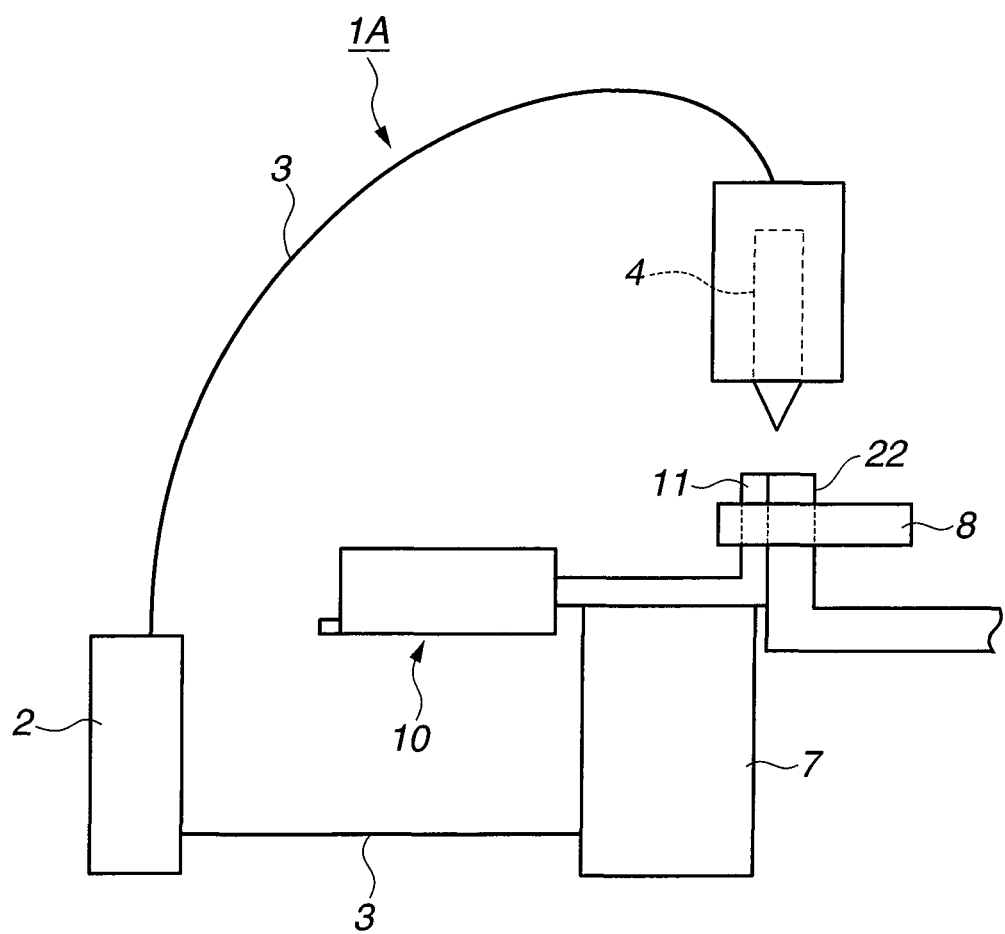
FIG. 16 is an illustrative view showing a welding by a micro spot TIG welder according to a fifth embodiment of the present invention.

In the above-described embodiments, the earth clamp jig has both of the earth (grounding) function and the clamp function. However, the terminal 11 and so on and the bus bar 22 may be arc-welded by using a micro spot TIG welder 1A including an earth board 7 serving as the earth jig, and a clamp jig 8, independently, as shown in FIG. 16. In this micro spot TIG welder 1A, the earth board 7 connected with the welder body 2 by the wire 3 is made from conductive material. The earth board 7 brings all of the terminals of the welded components to the identical potential. Moreover, all of the terminals 11 of the FET 10 are pressed on the earth board 7 from the upward direction at the welding so that all of the terminals 11 of the FET 10 contact the earth board 7. Moreover, the clamp jig 8 does not need to be connected to the welder body 2. This clamp jig 8 may clamp the terminal and the bus bar which are to be welded. Moreover, all of the terminals or the terminals which are problematic in the withstand voltage and so on may be clamped.

Moreover, the second and third embodiments use the FET (electronic component) including terminals which are apart from each other by varying protrusion positions of the terminals. However, it is optional to ensure the sufficient clearance between the terminals by using the other components (for example, a pin, a metal substrate (board) or so on) in the FET.

The entire contents of Japanese Patent Application No. 2009-215144 filed Sep. 17, 2009 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A method of welding a circuit conductor and one of a plurality of terminals of only one electronic component of a control apparatus by melting and joining by a welding arc from a first electrode of a micromini TIG welder, the method comprising:
    setting at least two of the plurality of the terminals of the only one electronic component including the one of the plurality of the terminals to be welded, and another one of the plurality of the terminals of the only one electronic component which is influenced by a flying of the welding arc, to an identical potential by sandwiching the at least two of the plurality of the terminals of the only one electronic component, by an earth clamp jig serving as a second electrode; and
    arc-welding the one of the plurality of the terminals of the only one electronic component to be welded and the circuit conductor to be welded while the one of the plurality of the terminals of the only one electronic component to be welded and the circuit conductor to be welded are grounded.

2. A method of welding a circuit conductor and one of a plurality of terminals of only one electronic component of a control apparatus by melting and joining by a welding arc from a first electrode of a micromini TIG welder, the method comprising:
    using the only one electronic component including the terminals which are apart from each other;
    setting at least two of the plurality of the terminals of the only one electronic component including the one of the plurality of the terminals to be welded, and another one of the plurality of the terminals of the only one electronic component which is influenced by a flying of the welding arc, to an identical potential by sandwiching the at least two of the plurality of terminals of the only one electronic component, by an earth clamp jig serving as a second electrode; and arc-welding the one of the plurality of the terminals of the only one electronic component to be welded and the circuit conductor to be welded while the one of the plurality of the terminals of the only one electronic component to be welded and the circuit conductor to be welded are grounded.

3. The method defined in claim 2, wherein the earth clamp jig includes dampers that clamp the terminals which are apart from each other, respectively, and that sandwiches, respectively, the at least two of the plurality of the terminals of the only one electronic component including the one of the plurality of the terminals to be welded, and another of the plurality of the terminals of the only one electronic component which is influenced by a flying of the welding arc, so as to set the at least two of the plurality of the terminals of the only one electronic component to the identical potential.

\* \* \* \* \*